(12) United States Patent
Kim (10) Patent No.: US 9,583,752 B2
(45) Date of Patent: Feb. 28, 2017

(54) SECONDARY BATTERY

(71) Applicant: SAMSUNG SDI CO., LTD., Yongin-si, Gyeonggi-do (KR)

(72) Inventor: Seungmo Kim, Yongin (KR)

(*) Notice: Subject to any disclaimer, the term of this patent is extended or adjusted under 35 U.S.C. 154(b) by 118 days.

(21) Appl. No.: 14/582,966

(22) Filed: Dec. 24, 2014

(65) Prior Publication Data

US 2015/0194657 A1   Jul. 9, 2015

(30) Foreign Application Priority Data

Jan. 9, 2014   (KR) .................. 10-2014-0002888

(51) Int. Cl.

| | |
|---|---|
| *H01M 2/22* | (2006.01) |
| *H01M 2/34* | (2006.01) |
| *H01M 2/26* | (2006.01) |
| *H01M 2/04* | (2006.01) |
| *H01M 10/04* | (2006.01) |
| *H01M 10/0585* | (2010.01) |
| *H01M 10/0587* | (2010.01) |
| *H01M 6/46* | (2006.01) |

(52) U.S. Cl.
CPC .............. *H01M 2/22* (2013.01); *H01M 2/04* (2013.01); *H01M 2/348* (2013.01); *H01M 6/46* (2013.01); *H01M 10/04* (2013.01); *H01M 10/0585* (2013.01); *H01M 10/0587* (2013.01); *H01M 2/0426* (2013.01); *H01M 2/26* (2013.01); *H01M 2200/103* (2013.01)

(58) Field of Classification Search
CPC ............. H01M 10/04; H01M 10/0585; H01M 10/0587; H01M 2200/103; H01M 2/04; H01M 2/0426; H01M 2/22; H01M 2/26; H01M 2/348; H01M 6/46
See application file for complete search history.

(56) References Cited

U.S. PATENT DOCUMENTS

| | | | |
|---|---|---|---|
| 8,617,737 B2* | 12/2013 | Byun ................. | H01M 2/0426 429/161 |
| 2013/0040191 A1* | 2/2013 | Kim ...................... | H01M 2/22 429/179 |

FOREIGN PATENT DOCUMENTS

| | | |
|---|---|---|
| JP | 11-219697 A | 8/1999 |
| JP | 2000-311701 A | 11/2000 |
| JP | 2012-048911 A | 3/2012 |

* cited by examiner

*Primary Examiner* — Carlos Barcena
(74) *Attorney, Agent, or Firm* — Lee & Morse, P.C.

(57) ABSTRACT

A secondary battery including a first electrode assembly, the first electrode assembly including a first positive electrode uncoated portion and a first negative electrode uncoated portion; a second electrode assembly horizontally parallel with the first electrode assembly, the second electrode assembly including a second positive electrode uncoated portion and a second negative electrode uncoated portion; a first collector plate that is electrically connected to the first positive electrode uncoated portion; a second collector plate that is electrically connected to the second positive electrode uncoated portion; a third collector plate that is electrically connected to the first negative electrode uncoated portion and to the second negative electrode uncoated portion; a case accommodating the first electrode assembly, the second electrode assembly, the first collector plate, the second collector plate, and the third collector plate; and a cap plate sealing the case, wherein the third collector plate includes a fuse hole therein.

20 Claims, 7 Drawing Sheets

SECONDARY BATTERY

CROSS-REFERENCE TO RELATED APPLICATION

Korean Patent Application No. 10-2014-0002888 filed on Jan. 9, 2014, in the Korean Intellectual Property Office, and entitled: "SECONDARY BATTERY," is incorporated by reference herein in its entirety.

BACKGROUND

1. Field

Embodiments relate to a secondary battery.

2. Description of the Related Art

Secondary batteries may be discharged and recharged, unlike primary batteries, which are not rechargeable. Secondary batteries may be of a low capacity type, which includes battery cells in the form of a pack typically used for small portable electronic devices such as cellular phones and camcorders. Secondary batteries may be of a high capacity type, which includes battery cells used as a motor-driving power source and having several battery cells connected to one another and widely used as a power source for hybrid vehicles, etc.

Secondary batteries may be manufactured in various shapes, such as cylindrical shape or prismatic shapes. A secondary battery may include an electrode assembly having a positive plate and a negative plate with a separator acting as an insulator between the positive and negative plates accommodated in a battery case with an electrolyte, and a cap assembly having electrode terminals coupled with the case.

SUMMARY

Embodiments are directed to a secondary battery.

The embodiments may be realized by providing a secondary battery including a first electrode assembly, the first electrode assembly including a first positive electrode uncoated portion and a first negative electrode uncoated portion; a second electrode assembly horizontally parallel with the first electrode assembly, the second electrode assembly including a second positive electrode uncoated portion and a second negative electrode uncoated portion; a first collector plate that is electrically connected to the first positive electrode uncoated portion; a second collector plate that is electrically connected to the second positive electrode uncoated portion; a third collector plate that is electrically connected to the first negative electrode uncoated portion and to the second negative electrode uncoated portion; a case accommodating the first electrode assembly, the second electrode assembly, the first collector plate, the second collector plate, and the third collector plate; and a cap plate sealing the case, wherein the third collector plate includes a fuse hole therein.

The third collector plate may include a third horizontal part between the cap plate and the first electrode assembly; and a third vertical part that is bent to extend from the third horizontal part to a lower portion of the case, wherein the fuse hole passes through the third horizontal part.

The third vertical part may be between the first electrode assembly and the second electrode assembly.

The third horizontal part may include: a first long side surface and a second long side surface facing each other; and a first short side surface and a second short side surface facing each other, the first short side surface and the second short side surface connecting the first long side surface and the second long side surface, and the fuse hole may be adjacent to the first short side surface.

The third vertical part may be adjacent to the first short side surface, and may include a front vertical part on the first long side surface and a rear vertical part on the second long side surface.

The first negative electrode uncoated portion may be coupled with the front vertical part, and the second negative electrode uncoated portion may be coupled with the rear vertical part.

The fuse hole may have a width that is greater than a width of the third vertical part.

The third horizontal part may include a fuse area adjacent to the third vertical part, the fuse area being between the fuse hole and the first long side surface and between the fuse hole and the second long side surface, and the fuse area may be meltable such that the fuse area separates the first electrode assembly and the second electrode assembly from each other when a short-circuit occurs in the secondary battery.

The third horizontal part may include a terminal hole therein, the terminal hole being adjacent to the second short side surface.

The fuse hole may penetrate at least a portion of the first short side surface.

The third collector plate may be between the first collector plate and the second collector plate.

The first collector plate may include a first horizontal part between the cap plate and the first electrode assembly, the first horizontal part being coupled with a bottom surface of the cap plate, and a first vertical part that is bent to extend from the first horizontal part to a lower portion of the case.

The second collector plate may include a second horizontal part between the cap plate and the second electrode assembly, the second horizontal part including a terminal hole therein, and a second vertical part that is bent to extend from the second horizontal part to a lower portion of the case.

The secondary battery may further include a first electrode terminal passing through the cap plate at one side of the cap plate; and a second electrode terminal passing through the cap plate at another side of the cap plate.

The first electrode terminal may be electrically connected to the third collector plate.

The second electrode terminal may be electrically connected to the second collector plate.

The first collector plate and the second collector plate may be electrically connected to the cap plate, and the third collector plate may be insulated from the cap plate.

The case may include a bottom surface and a pair of long side surfaces and a pair of short side surfaces upwardly extending from the bottom surface.

The first positive electrode uncoated portion may be at one side of the first electrode assembly, the first negative electrode uncoated portion may be at another side of the first electrode assembly, the first positive electrode uncoated portion may be adjacent to one of the short side surfaces of the case, and the first negative electrode uncoated portion may be at a center of the case.

The second positive electrode uncoated portion may be at one side of the second electrode assembly, the second negative electrode uncoated portion may be at another side of the second electrode assembly, the second positive electrode uncoated portion may be adjacent to one of the short side surfaces of the case, and the second negative electrode uncoated portion may be at a center of the case.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
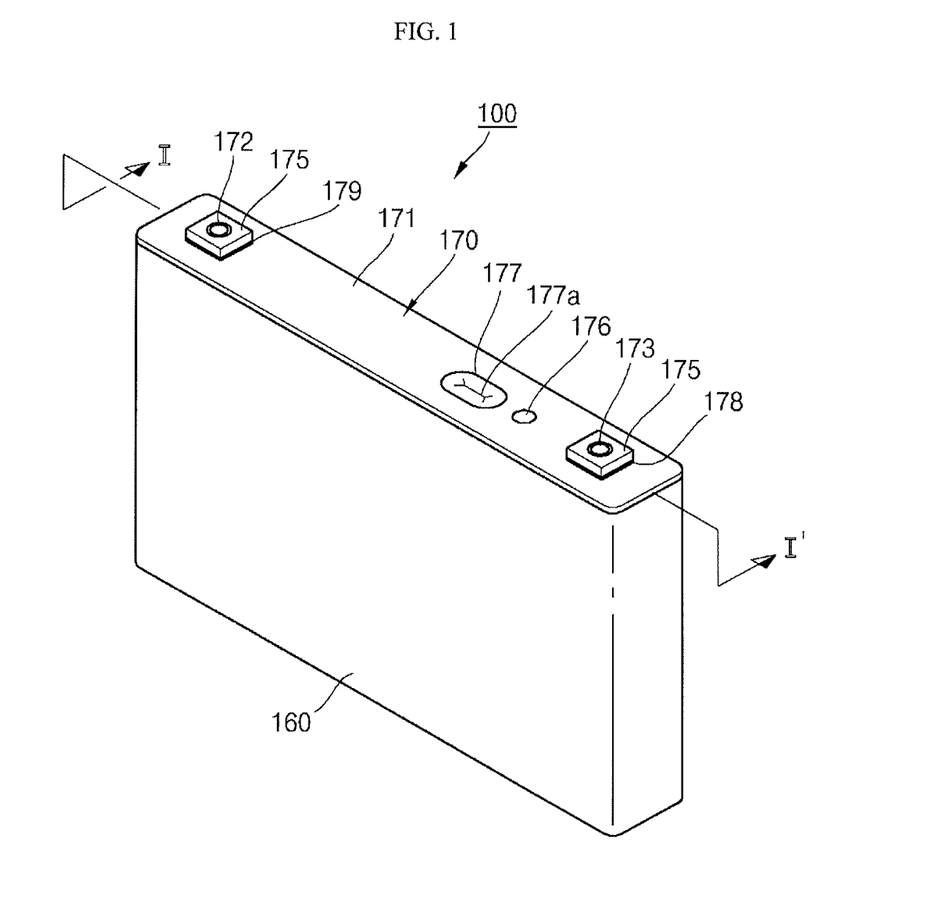
FIG. 1 illustrates a perspective view of a secondary battery according to an embodiment.
Figure 2:
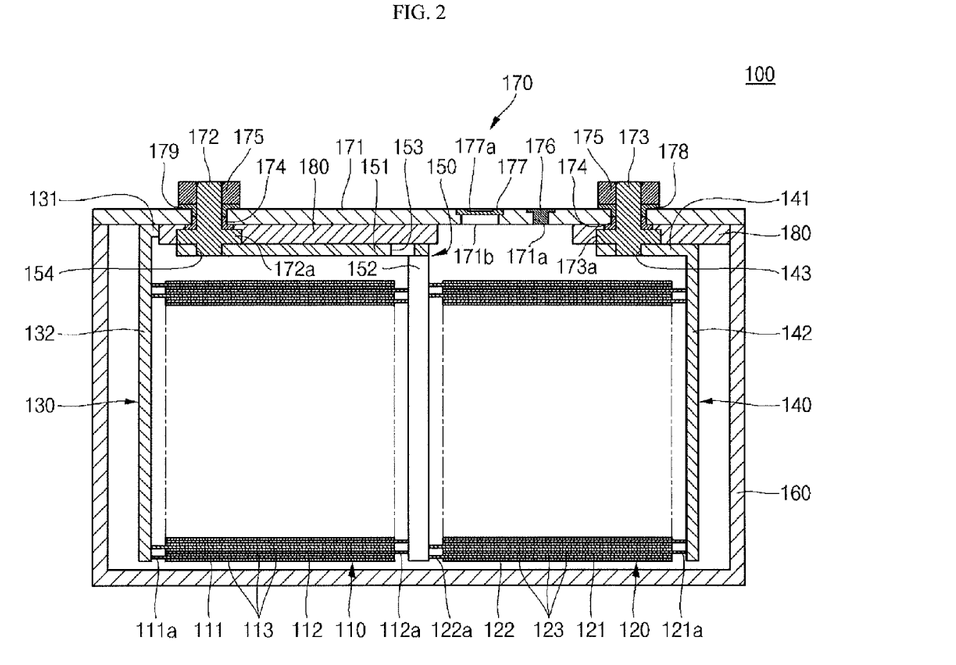
FIG. 2 illustrates a cross-sectional view of the secondary battery taken along the line I-I' of FIG. 1.
Figure 3:
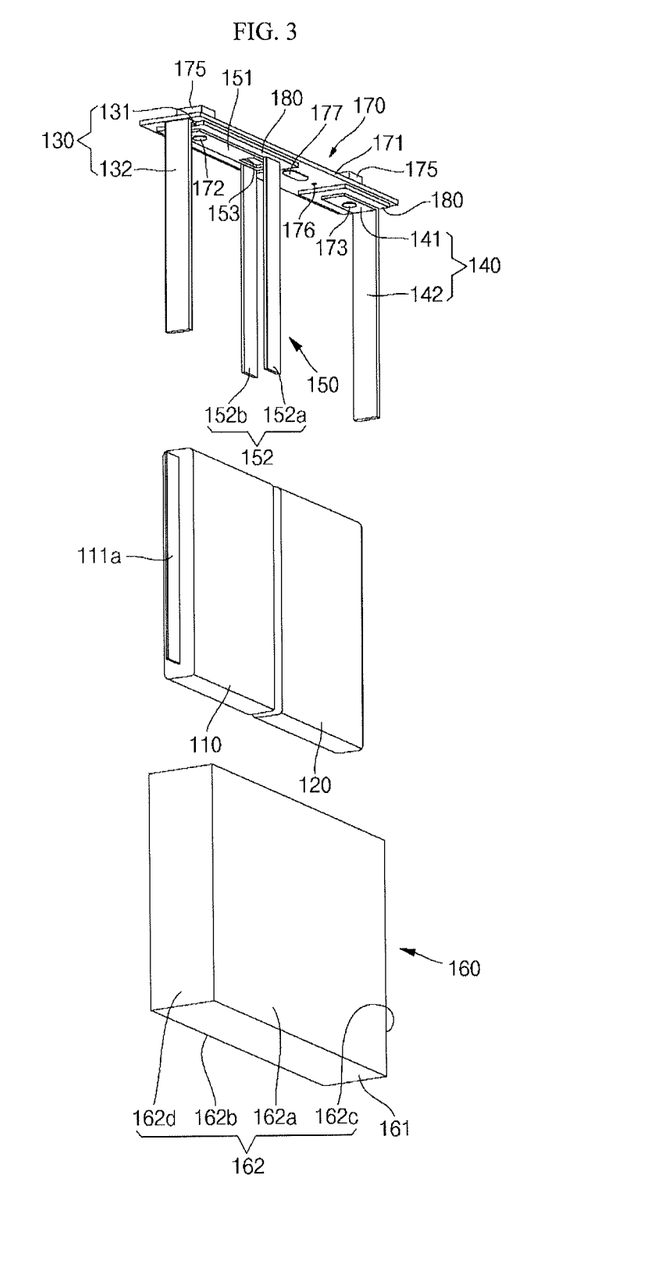
FIG. 3 illustrates an exploded perspective view of the secondary battery shown in FIG. 1.
Figure 4:
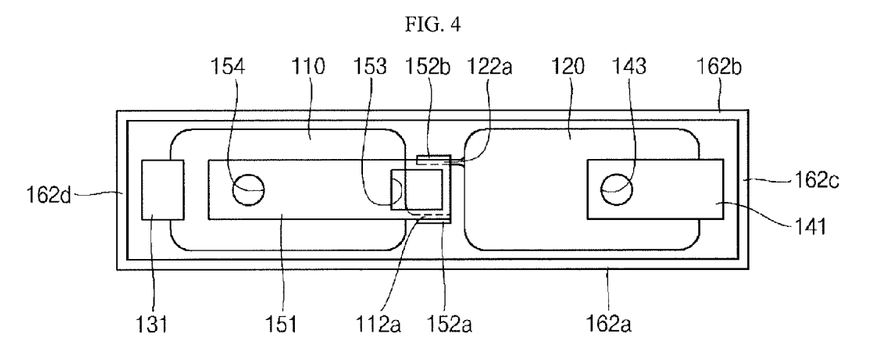
FIG. 4 illustrates a plan view of the secondary battery shown in FIG. 1, without a cap assembly.
Figure 5:
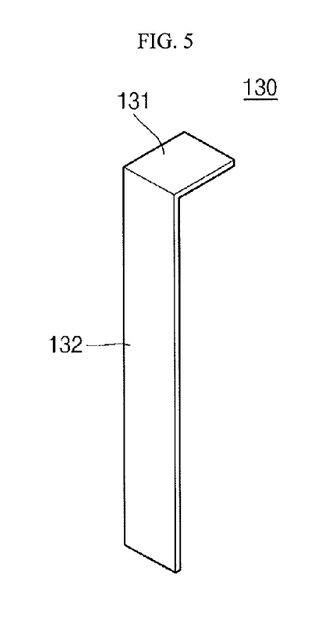
FIG. 5 illustrates a perspective view of a first collector plate in the secondary battery shown in FIG. 1.
Figure 6:
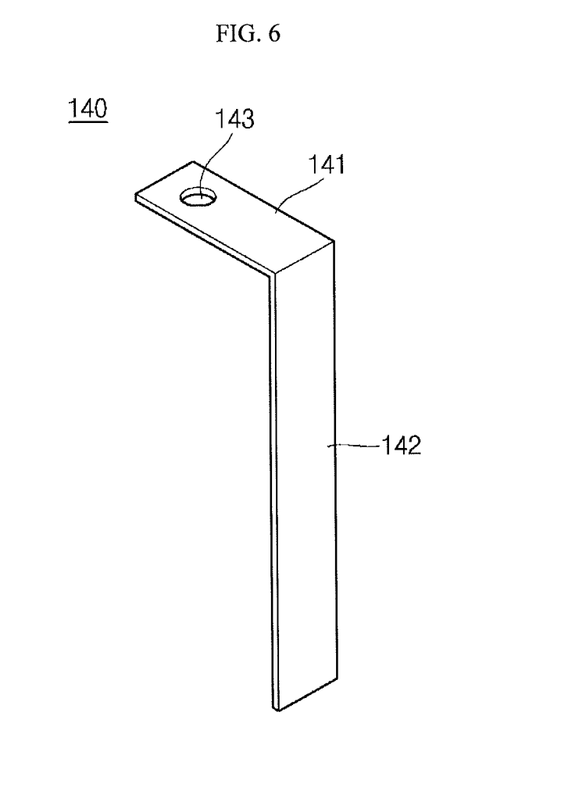
FIG. 6 illustrates a perspective view of a second collector plate in the secondary battery shown in FIG. 1.
Figure 7:
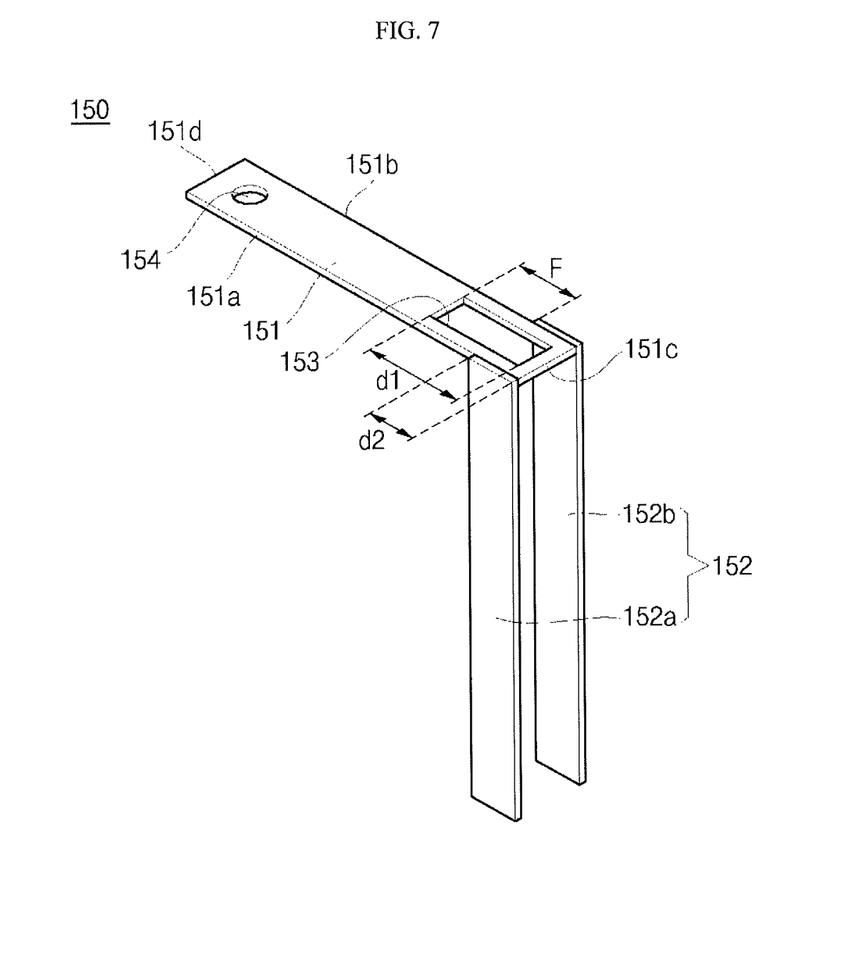
FIG. 7 illustrates a perspective view of a third collector plate in the secondary battery shown in FIG. 1.

FIG. 1 illustrates a perspective view of a secondary battery according to an embodiment, FIG. 2 illustrates a cross-sectional view of the secondary battery taken along the line I-I' of FIG. 1, FIG. 3 illustrates an exploded perspective view of the secondary battery shown in FIG. 1, FIG. 4 illustrates a plan view of the secondary battery shown in FIG. 1, without a cap assembly, FIG. 5 illustrates a perspective view of a first collector plate in the secondary battery shown in FIG. 1, FIG. 6 illustrates a perspective view of a second collector plate in the secondary battery shown in FIG. 1, and FIG. 7 illustrates a perspective view of a third collector plate in the secondary battery shown in FIG. 1.

Referring to FIGS. 1 to 4, the secondary battery 100 according to an embodiment may include a first electrode assembly 110, a second electrode assembly 120, a first collector plate 130, a second collector plate 140, a third collector plate 150, a case 160, and a cap assembly 170.

The first electrode assembly 110 may include a wound or laminated stacked structure having a first positive electrode plate 111, a first separator 113, and a first negative electrode plate 112, and, may be a thin plate or a thin foil shape.

The first positive electrode plate 111 may include a positive electrode collector formed of a metal foil made of, e.g., aluminum (Al), and a positive electrode active material, e.g., a transition metal oxide, on the positive electrode collector. In addition, the first positive electrode plate 111 may include a first positive electrode uncoated portion 111a where the positive electrode active material is not applied.

The first electrode uncoated portion 111a may function as a passage for current flowing between the first positive electrode plate 111 and an exterior of the first positive electrode plate 111.

The first negative electrode plate 112 may include a negative electrode collector formed of a metal foil made of, e.g., copper (Cu) or nickel (Ni), and a negative electrode active material, e.g., graphite or carbon, on the negative electrode collector. In addition, the first negative electrode plate 112 may include a first negative electrode uncoated portion 112a where the negative electrode active material is not applied. The first electrode uncoated portion 112a may function as a passage for current flowing between the first negative electrode plate 112 and an exterior of the first negative electrode plate 112.

The first separator 113 may be between the first positive electrode plate 111 and the first negative electrode plate 112 to help prevent electrical short circuits and to allow movement of lithium ions. The first separator 113 may be made of, e.g., a material selected from the group of polyethylene, polypropylene, or a copolymer of polypropylene and polyethylene.

The second electrode assembly 120 may include a wound or laminated stacked structure having a second positive electrode plate 121, a second separator 123, and a second negative electrode plate 122, and, may be a thin plate or a thin foil shape. In addition, the second positive electrode plate 121 may include a second positive electrode uncoated portion 121a where the positive electrode active material is not applied. The second positive electrode uncoated portion 121a may function as a passage for current flowing between the second positive electrode plate 121 and an exterior of the second positive electrode plate 121. The second electrode assembly 120 may be the same with the first electrode assembly 110, and a repeated description thereof may be omitted.

The first electrode assembly 110 and the second electrode assembly 120 may be accommodated in the case 160 along with an electrolyte. The electrolyte may include an organic solvent, e.g., EC, PC, DEC, EMC, or DMC, and a lithium salt, e.g., $LiPF_6$, or $LiBF_4$. In an implementation, the electrolyte may be in a liquid, solid or gel phase.

In addition, the first electrode assembly 110 and the second electrode assembly 120 may be arranged to be horizontally parallel with each other within the case 160. For example, as shown in FIG. 2, the first electrode assembly 110 may be positioned to the left and the second electrode assembly 120 may be positioned to the right within the case 160. The first electrode assembly 110 may be positioned such that the first electrode uncoated portion 111a faces a short side surface 162c of the case 160 and the first negative electrode uncoated portion 112a faces or is at a center of the case 160. In addition, the second electrode assembly 120 may be positioned such that the second positive electrode uncoated portion 121a faces a short side surface 162d of the case 160 and the second negative electrode uncoated portion 122a faces or is at the center of the case 160. Therefore, the first negative electrode uncoated portion 112a of the first electrode assembly 110 and the second negative electrode uncoated portion 122a of the second electrode assembly 120 may face each other at the center of the case 160.

The first collector plate 130 may be made of a conductive material, e.g., aluminum, and may be coupled with the first electrode uncoated portion 111a that protrudes at one end of the first electrode assembly 110 to be electrically connected to the first positive electrode plate 111. Referring to FIG. 5, the first collector plate 130 may include a first horizontal part 131 and a first vertical part 132.

The first horizontal part 131 may be between a top portion of the first electrode assembly 110 and a bottom portion of the cap assembly 170, and may be plate-shaped. For example, the first horizontal part 131 may be horizontally parallel with the cap plate 171 of the cap assembly 170, and may be coupled with a bottom surface of the cap plate 171. In an implementation, the first horizontal part 131 may be welded to the cap plate 171 or may be integrally formed with the cap plate 171.

The first vertical part 132 may be bent to extend from an end of the first horizontal part 131. In an implementation, the first vertical part 132 may extend perpendicularly from an end of the first horizontal part 131. The first vertical part 132 may be perpendicular to the first horizontal part 131 and the cap plate 171, and may be parallel with a side surface 162 of the case 160. For example, the first vertical part 132 may be parallel with short side surfaces 162c and 162d of the case 160, and may be plate shaped. In an implementation, the first vertical part 132 may be at one side of the first electrode assembly 110 and may be coupled with the first electrode uncoated portion 111a. In an implementation, the first vertical part 132 may be welded to the first electrode uncoated portion 111a.

The second collector plate 140 may be made of a conductive material, e.g., aluminum, and may be coupled with the second positive electrode uncoated portion 121a protruding to one end of the second electrode assembly 120 to be electrically connected to the second positive electrode plate 121. Referring to FIG. 6, the second collector plate 140 may include a second horizontal part 141 and a second vertical part 142.

The second horizontal part 141 may be between a top portion of the second electrode assembly 120 and the bottom portion of the cap assembly 170 and may be plate shaped. For example, the second horizontal part 141 may be horizontally parallel with the cap plate 171 of the cap assembly 170, and may be coupled with the bottom surface of the cap plate 171. A terminal hole 143 may be formed at one side of the second horizontal part 141. A second electrode terminal 173 of the cap assembly 170 may be fitted into the terminal hole 143 to be coupled therewith.

The second vertical part 142 may be bent to extend from an end of the second horizontal part 141. In an implementation, the second vertical part 142 may extend perpendicularly from an end of the second horizontal part 141. The second vertical part 142 may be perpendicular to the second horizontal part 141 and the cap plate 171 and may be parallel with the side surface 162 of the case 160. For example, the second vertical part 142 may be parallel with the short side surfaces 162c and 162d of the case 160 and may be plate shaped. In an implementation, the second vertical part 142 may be one side of the second electrode assembly 120 and may be coupled with the second positive electrode uncoated portion 121a. For example, the second vertical part 142 may be welded to the second positive electrode uncoated portion 121a.

The third collector plate 150 may be made of a conductive material, e.g., nickel. The third collector plate 150 may be coupled with the first negative electrode uncoated portion 112a (that protrudes at another end of the first electrode assembly 110) and coupled with the second negative electrode uncoated portion 122a (that protrudes at another end of the second electrode assembly 120), to then be electrically connected to the first negative electrode plate 112 and the second negative electrode plate 122. For example, the third collector plate 150 may be between the first collector plate 130 and the second collector plate 140. Referring to FIG. 7, the third collector plate 150 may include, e.g., a third horizontal part 151, a third vertical part 152, and a fuse hole 153.

The third horizontal part 151 may be between the top portion of the first electrode assembly 110 and the bottom portion of the cap assembly 170 and may be plate shaped. For example, the third horizontal part 151 may be horizontally parallel with the cap plate 171 of the cap assembly 170. The third horizontal part 151 may include a pair of long side surfaces 151a and 151b and a pair of short side surfaces 151c and 151d connecting the pair of long side surfaces 151a and 151b. For example, the third horizontal part 151 may include a first long side surface 151a, a second long side surface 151b, a first short side surface 151c, and a second short side surface 151d. The fuse hole 153 may be in the vicinity of or adjacent to the first short side surface 151c of the third horizontal part 151, and a terminal hole 154 may be in the vicinity of or adjacent to the second short side surface 151d of the third horizontal part 151. For example, the fuse hole 153 may be adjacent to one end of the third horizontal part 151, and the terminal hole 154 may be adjacent to another, opposite end of the third horizontal part 151. A first electrode terminal 172 of the cap assembly 170 may be fitted into the terminal hole 154 to then be coupled therewith.

The third vertical part 152 may be bent to extend from an end of the third horizontal part 151, e.g., at both sides of the third horizontal part 151. In an implementation, the third vertical part 152 may extend perpendicularly from sides, e.g., both sides, of the third horizontal part 151. For example, the third vertical part 152 may be adjacent to the first short side surface 151c of the third horizontal part 151 and may be on or extend from the first long side surface 151a and the second long side surface 151b of the third horizontal part 151. The third vertical part 152 may be perpendicular to the third horizontal part 151 and the cap plate 171, and may be parallel with the side surface 162 of the case 160. For example, the third vertical part 152 may be parallel with long side surfaces 162a and 162b of the case 160 and may be plate shaped. In an implementation, the third vertical part 152 may be between the first electrode assembly 110 and the second electrode assembly 120, and may be coupled with the first negative electrode uncoated portion 112a and the second negative electrode uncoated portion 122a.

In an implementation, the third vertical part 152 may include, e.g., a front vertical part 152a and a rear vertical part 152b. The front vertical part 152a and the rear vertical part 152b may face or be parallel with each other. The front vertical part 152a (on or extending from the first long side surface 151a of the third horizontal part 151) may be coupled with the first electrode assembly 110. The rear vertical part 152b (on or extending from the second long side surface 151b of the third horizontal part 151) may be coupled with the second electrode assembly 120. For example, the first negative electrode uncoated portion 112a of the first electrode assembly 110 may be welded to the front vertical part 152a, and the second negative electrode uncoated portion 122a of the second electrode assembly 120 may be welded to the rear vertical part 152b.

The fuse hole 153 may be adjacent to the first short side surface 151c of the third horizontal part 151. For example, the fuse hole 153 may pass through the third horizontal part 151. An area of the third horizontal part 151 where the fuse hole 153 is formed may have a smaller sectional area than another area of the third horizontal part 151. In an implementation, the fuse hole 153 may have a rectangular shape, e.g., a horizontally elongated rectangle extending from the first short side surface 151c to the second short side surface 151d. In an implementation, the fuse hole 153 may have any suitable shape, e.g., a circular shape, an elliptical shape, or a triangular shape, that provides the third horizontal part 151 with a smaller sectional area.

A width d1 of the fuse hole 153 may be larger than a width d2 of the third vertical part 152 (d1>d2), e.g., in a same direction, such as a lengthwise direction of the third horizontal part 151. Therefore, a fuse area F (where the third vertical part 152 is not formed) may exist between the fuse hole 153 and the first long side surface 151a and the second long side surface 151b of the third horizontal part 151. The fuse hole 153 and fuse area F may function as a fuse that interrupts the flow of current, e.g., the fuse area F may be melted by heat generated when a large amount of current flows in the secondary battery 100, due to, e.g., a short circuit occurring to the secondary battery 100. For example, the fuse area F may be meltable such that the fuse area separates the first electrode assembly 110 and the second electrode assembly 120 from each other when a short-circuit occurs in the secondary battery 100.

In addition, the fuse area F and the fuse hole 153 may cut off a connection between the first electrode assembly 110 and the second electrode assembly 120. For example, if an internal short circuit occurs to the secondary battery 100, or if the secondary battery 100 is penetrated by an external needle-shaped body, the fuse area F (adjacent to the fuse hole 153) may be melted to cut off the flow of current, thereby preventing the second electrode assembly 120 from being short circuited. Therefore, if an internal short circuit occurs to the secondary battery 100, or if the secondary battery 100 is penetrated by an external needle-shaped body, reaction energy of the electrode assembly may be reduced, thereby improving the safety of the secondary battery 100.

The case 160 may be made of a conductive metal, e.g., aluminum, an aluminum alloy, or a nickel plated steel, and may have an approximately hexahedron shape having an opening through which the first electrode assembly 110, the second electrode assembly 120, the first collector plate 130, the second collector plate 140, and the third collector plate 150 may be inserted and placed. The case 160 and the cap assembly 170 may be coupled to each other as illustrated in FIG. 2, and thus the opening is not illustrated. However, the opening of the case 160 according to an embodiment may correspond to a substantially opened portion of an edge of the cap assembly 170. In addition, the case 160 may include a bottom surface 161 and the side surface 162 may upwardly extend from the bottom surface 161. The side surface 162 may include the pair of long side surfaces 162a and 162b facing or parallel with each other, and the pair of short side surfaces 162c and 162d connecting the long side surfaces 162a and 162b and facing or parallel with each other. In an implementation, an inner surface of the case 160 may be insulated, so that it is insulated from the first electrode assembly 110, the second electrode assembly 120, the first collector plate 130, the second collector plate 140, and the third collector plate 150. In an implementation, the case 140 may have a polarity, e.g., the case 40 may have the same polarity as a positive electrode.

The cap assembly 170 may be coupled with the case 160. For example, the cap assembly 170 may include a cap plate 171, a first electrode terminal 172, a second electrode terminal 173, a gasket 174, and a terminal plate 175. In an implementation, the cap assembly 170 may further include a plug 176, a vent plate 177, a connection member 178, an upper insulation member 179, and a lower insulation member 180.

The cap plate 171 may close or seal the opening of the case 160 and may be made of the same material as that of the case 160. For example, the cap plate 171 may be coupled with the case 160 by laser welding. In an implementation, the cap plate 171 may have the same polarity as that of the case 160. In an implementation, the first collector plate 130 may be coupled with the bottom surface of the cap plate 171, and the cap plate 171 functions or have the same polarity as a positive electrode.

The first electrode terminal 172 (passing through one side of the cap plate 171) may be electrically connected to the third collector plate 150. The first electrode terminal 172 may have a pillar shape, and a flange 172a at a lower portion thereof and adjacent to a lower portion of the cap plate 171 may help prevent the first electrode terminal 172 from being dislodged from the cap plate 171. A region of the first electrode terminal 172 at a lower portion of the flange 172a may be fitted into the terminal hole 154 of the third collector plate 150. In an implementation, the first electrode terminal 172 may be insulated from the cap plate 171.

The second electrode terminal 173 (passing through the other side of the cap plate 171) may be electrically connected to the second collector plate 140. The second electrode terminal 173 may have the same configuration as the first electrode terminal 172, and repeated descriptions thereof may be omitted. In an implementation, the second electrode terminal 173 may be electrically connected to the cap plate 171.

The gasket 174 may be made of an insulating material and may be between each of the first electrode terminal 172 and the second electrode terminal 173 and the cap plate 171 to seal a space between each of the first electrode terminal 172 and the second electrode terminal 173 and the cap plate 171. The gasket 174 may help prevent introduction of external moisture into the secondary battery 100 and/or may help prevent leakage of electrolyte from the secondary battery 100.

The terminal plate 175 may be coupled with the first electrode terminal 172 and the second electrode terminal 173. In an implementation, the terminal plate 175 may be welded to the first electrode terminal 172 and the second electrode terminal 173 and may fix the first electrode terminal 172 and the second electrode terminal 173 to the cap plate 171. For example, boundary regions between the first electrode terminal 172 and the second electrode terminal 173 (exposed to an upper portion of the cap plate 171 and the terminal plate 175) may be welded to each other. For example, a laser beam may be applied to the boundary regions between the first electrode terminal 172 and the second electrode terminal 173 (exposed to an upper portion of the cap plate 171 and the terminal plate 175), thereby melting and then cooling the boundary regions to then be welded.

The plug 176 may seal an electrolyte injection hole 171a of the cap plate 171.

The vent plate 177 may be within a vent hole 171b of the cap plate 171, may include a notch 177a, and may be configured to open at a preset pressure.

The connection member 178 may be configured such that the second electrode terminal 173 is inserted between the second electrode terminal 173 and the cap plate 171, and may make close contact with the cap plate 171 and the gasket 174 through the terminal plate 175. The connection member 178 may be electrically connected to the second electrode terminal 173 and the cap plate 171.

The upper insulation member 179 may be configured such that the first electrode terminal 172 is inserted between the first electrode terminal 172 and the cap plate 171, and makes close contact with the cap plate 171 and the gasket 174 through the terminal plate 175. The upper insulation member 179 may insulate the first electrode terminal 172 and the cap plate 171 from each other.

The lower insulation member 180 may be between each of the second collector plate 140 and the third collector plate 150 and the cap plate 171, and may help prevent unnecessary or undesirable short circuits from occurring therein. For example, the lower insulation member 180 may be between the second horizontal part 141 of the second collector plate 140 and the cap plate 171. In an implementation, the lower insulation member 180 may be between the third horizontal part 151 of the third collector plate 150 and the cap plate 171.

As described above, the secondary battery 100 according to an embodiment may include the fuse hole 153 in the third collector plate 150 (that connects the first electrode assembly 110 and the second electrode assembly 120), thereby separating the first electrode assembly 110 and the second electrode assembly 120 from each other if an internal short circuit or penetration by an external needle-shaped body were to occur. Therefore, the secondary battery 100 according to an embodiment may help reduce the reaction energy of the electrode assembly, thereby improving the safety.

Figure 8:
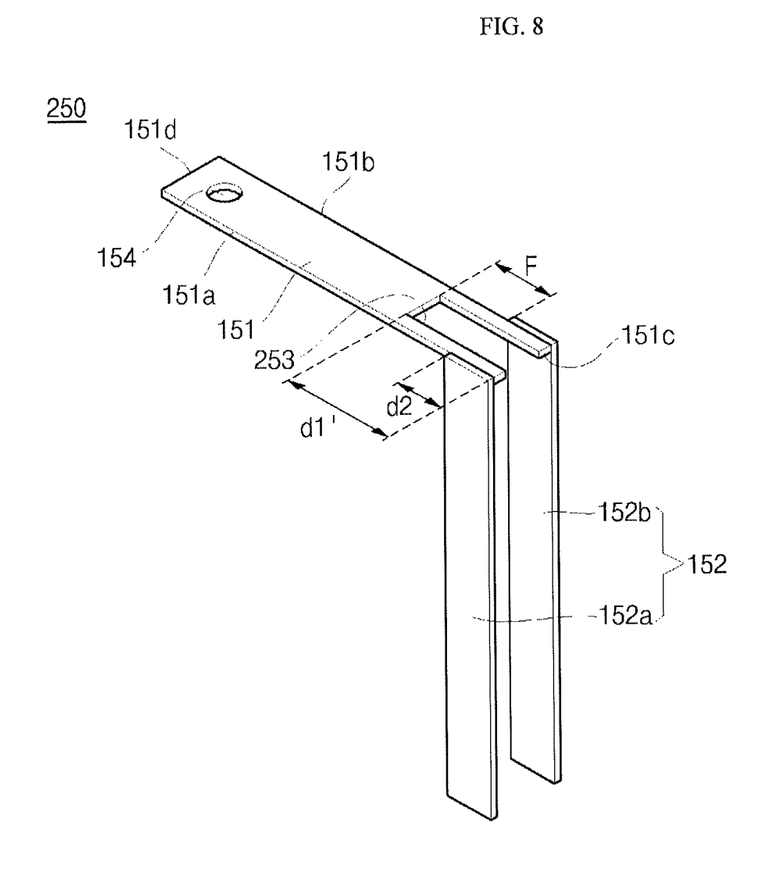
FIG. 8 illustrates a perspective view of a third collector plate in a secondary battery according to another embodiment.

FIG. 8 illustrates a perspective view of a third collector plate in a secondary battery according to another embodiment.

The secondary battery according to the present embodiment may be substantially the same as the secondary battery 100 shown in FIG. 2, in view of the same configuration and functions, except for the shape of a fuse hole 253 of the third collector plate 250. Thus, repeated illustration and explanations of the same functional elements may be omitted, and the following description will focus on the fuse hole 253 of the third collector plate 250.

Referring to FIG. 8, the third collector plate 250 may include a third horizontal part 151, a third vertical part 152, and a fuse hole 253.

The fuse hole 253 may be in the vicinity of or adjacent to a first short side surface 151c of the third horizontal part 151. For example, the fuse hole 253 may pass through the third horizontal part and may open a portion of the first short side surface 151c. For example, the fuse hole 253 may penetrate a portion first short side surface 151c. An area where the fuse hole 253 is formed may have a smaller sectional area than another area of the third horizontal part 151.

A width d1' of the fuse hole 253 may be larger than a width d2 of the third vertical part 152 (d1'>d2), e.g., in a same direction, such as a lengthwise direction of the third horizontal part 151. Therefore, a fuse area F (where the third vertical part 152 is not formed, e.g., adjacent to at sides of the third vertical part 152) may exist between the fuse hole 253 and a first long side surface 151a and a second long side surface 151b of the third horizontal part 151. The fuse hole 253 may function as a fuse that interrupts the flow of current such that the fuse area F may be melted by the heat generated when a large amount of current flows in the secondary battery due to a short circuit occurring to the secondary battery. In an implementation, the fuse hole 253 may cut off a connection between the first electrode assembly 110 and the second electrode assembly 120. For example, if an internal short circuit were to occur in the first electrode assembly 110, the fuse area F adjacent to the fuse hole 253 may be melted to cut off the flow of current, thereby preventing the second electrode assembly 120 from being short circuited. For example, the fuse area F may be meltable such that the fuse area F separates the first electrode assembly 110 and the second electrode assembly 120 from each other when a short-circuit occurs in the secondary battery 100.

By way of summation and review, when an internal short circuit occurs to a secondary battery, or a secondary battery is penetrated by an external needle-shaped body, excessive heat may be generated or an electrolyte may be decomposed, resulting in a fire or explosion. Accordingly, a secondary battery may be manufactured to have improved safety.

The embodiments may provide a secondary battery, which represents and advance in the related art.

The embodiments may provide a secondary battery, which exhibits improved safety and includes a fuse hole in an electrode or collector plate that connects a first electrode assembly and a second electrode assembly to thereby separate the first electrode assembly and the second electrode assembly from each other if an internal short circuit occurs or an external needle-shaped body penetrates the battery.

As described above, in the secondary battery according to an embodiment, safety may be improved by forming a fuse hole in a third collector plate connecting a first electrode assembly and a second electrode assembly to separate the first electrode assembly and the second electrode assembly from each other when an internal short circuit occurs or penetration is caused using an external needle-shaped body. Therefore, the secondary battery according to an embodiment may have improved safety by reducing reaction energy of the electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   a first electrode assembly, the first electrode assembly including a first positive electrode uncoated portion and a first negative electrode uncoated portion;
   a second electrode assembly horizontally parallel with the first electrode assembly, the second electrode assembly including a second positive electrode uncoated portion and a second negative electrode uncoated portion;
   a first collector plate that is electrically connected to the first positive electrode uncoated portion;
   a second collector plate that is electrically connected to the second positive electrode uncoated portion;
   a third collector plate that is electrically connected to the first negative electrode uncoated portion and to the second negative electrode uncoated portion;
   a case accommodating the first electrode assembly, the second electrode assembly, the first collector plate, the second collector plate, and the third collector plate; and
   a cap plate sealing the case, wherein the third collector plate includes:
a third horizontal part between the cap plate and the first electrode assembly,
a third vertical part that is bent to extend from the third horizontal part to a lower portion of the case, and
a fuse hole that passes through the third horizontal part.

2. The secondary battery as claimed in claim 1, wherein the third vertical part is between the first electrode assembly and the second electrode assembly.

3. The secondary battery as claimed in claim 1, wherein:
the third horizontal part includes:
a first long side surface and a second long side surface facing each other; and
a first short side surface and a second short side surface facing each other, the first short side surface and the second short side surface connecting the first long side surface and the second long side surface, and
the fuse hole is adjacent to the first short side surface.

4. The secondary battery as claimed in claim 3, wherein the third vertical part:
is adjacent to the first short side surface, and
includes a front vertical part on the first long side surface and a rear vertical part on the second long side surface.

5. The secondary battery as claimed in claim 4, wherein:
the first negative electrode uncoated portion is coupled with the front vertical part, and
the second negative electrode uncoated portion is coupled with the rear vertical part.

6. The secondary battery as claimed in claim 3, wherein the fuse hole has a width that is greater than a width of the third vertical part.

7. The secondary battery as claimed in claim 3, wherein:
the third horizontal part includes a fuse area adjacent to the third vertical part, the fuse area being between the fuse hole and the first long side surface and between the fuse hole and the second long side surface, and
the fuse area is meltable such that the fuse area separates the first electrode assembly and the second electrode assembly from each other when a short-circuit occurs in the secondary battery.

8. The secondary battery as claimed in claim 3, wherein the third horizontal part includes a terminal hole therein, the terminal hole being adjacent to the second short side surface.

9. The secondary battery as claimed in claim 3, wherein the fuse hole penetrates at least a portion of the first short side surface.

10. The secondary battery as claimed in claim 3, wherein the third collector plate is between the first collector plate and the second collector plate.

11. The secondary battery as claimed in claim 1, wherein the first collector plate includes:
a first horizontal part between the cap plate and the first electrode assembly, the first horizontal part being coupled with a bottom surface of the cap plate, and
a first vertical part that is bent to extend from the first horizontal part to a lower portion of the case.

12. The secondary battery as claimed in claim 1, wherein the second collector plate includes:
a second horizontal part between the cap plate and the second electrode assembly, the second horizontal part including a terminal hole therein, and
a second vertical part that is bent to extend from the second horizontal part to a lower portion of the case.

13. The secondary battery as claimed in claim 1, further comprising:

a first electrode terminal passing through the cap plate at one side of the cap plate; and
a second electrode terminal passing through the cap plate at another side of the cap plate.

14. The secondary battery as claimed in claim 13, wherein the first electrode terminal is electrically connected to the third collector plate.

15. The secondary battery as claimed in claim 13, wherein the second electrode terminal is electrically connected to the second collector plate.

16. The secondary battery as claimed in claim 1, wherein:
the first collector plate and the second collector plate are electrically connected to the cap plate, and
the third collector plate is insulated from the cap plate.

17. The secondary battery as claimed in claim 1, wherein the case includes a bottom surface and a pair of long side surfaces and a pair of short side surfaces upwardly extending from the bottom surface.

18. The secondary battery as claimed in claim 17, wherein:
the first positive electrode uncoated portion is at one side of the first electrode assembly,
the first negative electrode uncoated portion is at another side of the first electrode assembly,
the first positive electrode uncoated portion is adjacent to one of the short side surfaces of the case, and
the first negative electrode uncoated portion is at a center of the case.

19. The secondary battery as claimed in claim 17, wherein:
the second positive electrode uncoated portion is at one side of the second electrode assembly,
the second negative electrode uncoated portion is at another side of the second electrode assembly,
the second positive electrode uncoated portion is adjacent to one of the short side surfaces of the case, and
the second negative electrode uncoated portion is at a center of the case.

20. A secondary battery, comprising:
a first electrode assembly, the first electrode assembly including a first positive electrode uncoated portion and a first negative electrode uncoated portion;
a second electrode assembly horizontally parallel with the first electrode assembly, the second electrode assembly including a second positive electrode uncoated portion and a second negative electrode uncoated portion;
a first collector plate that is electrically connected to the first positive electrode uncoated portion;
a second collector plate that is electrically connected to the second positive electrode uncoated portion;
a third collector plate that is electrically connected to the first negative electrode uncoated portion and to the second negative electrode uncoated portion;
a case accommodating the first electrode assembly, the second electrode assembly, the first collector plate, the second collector plate, and the third collector plate; and
a cap plate sealing the case,
wherein the second collector plate includes:
a second horizontal part between the cap plate and the second electrode assembly, the second horizontal part including a terminal hole therein, and
a second vertical part that is bent to extend from the second horizontal part to a lower portion of the case.

* * * * *